United States Patent
Allemann et al.

(10) Patent No.: US 9,767,665 B2
(45) Date of Patent: Sep. 19, 2017

(54) OPTICAL SMOKE DETECTION UNIT FOR A SMOKE DETECTOR, WITH TWO LIGHT-EMITTING DIODES OPTICALLY COUPLED TOGETHER AND WITH AN ASSOCIATED CONTROL UNIT FOR THE DEDUCTION OF AGING INFORMATION AND A SMOKE DETECTOR

(71) Applicant: Siemens Schweiz AG, Zurich (CH)

(72) Inventors: Martin Allemann, Wetzikon (CH); Aleksandar Duric, Zug (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 15/236,581

(22) Filed: Aug. 15, 2016

(65) Prior Publication Data
US 2017/0046935 A1    Feb. 16, 2017

(30) Foreign Application Priority Data
Aug. 13, 2015    (EP) .................................... 15180932

(51) Int. Cl.
| G08B 17/10 | (2006.01) |
| G08B 17/103 | (2006.01) |
| G08B 29/24 | (2006.01) |
| H04B 10/50 | (2013.01) |
| H04B 10/60 | (2013.01) |

(52) U.S. Cl.
CPC .......... G08B 17/103 (2013.01); G08B 29/24 (2013.01); H04B 10/502 (2013.01); H04B 10/60 (2013.01)

(58) Field of Classification Search
CPC .... G08B 17/103; G08B 29/24; H04B 10/502; H04B 10/60
USPC ........................................................ 340/630
See application file for complete search history.

(56) References Cited

U.S. PATENT DOCUMENTS

| 2016/0323972 A1* | 11/2016 | Bora .................. H05B 33/0842 |
| 2016/0345394 A1* | 11/2016 | Warren ............. H05B 33/0815 |

FOREIGN PATENT DOCUMENTS

| DE | 102013204962 A1 | 10/2014 | ............ G08B 29/00 |
| DE | 202015000820 U1 | 3/2015 | ............ G91B 15/06 |
| JP | 2011203010 A | 10/2011 | ............ G01N 21/59 |

* cited by examiner

*Primary Examiner* — Tanmay Shah
(74) *Attorney, Agent, or Firm* — Slayden Grubert Beard PLLC

(57) ABSTRACT

An optical smoke detection unit, e.g., for a smoke detector, may include first and second light-emitting diodes for emitting monochromatic, dichromatic or polychromatic light, an optical receiver for smoke detection, and a control unit that controls the light-emitting diodes and evaluates a receive signal output by the optical receiver for fire parameters. The light-emitting diodes may be optically coupled together such that at least one of the light-emitting diodes illuminates the other. The control unit may control one light-emitting diode in an alternating fashion and switch the other light-emitting diode to operate as a photodiode, and simultaneously detect a photoelectric current as a measure of emitted luminous flux of the controlled light-emitting diode. The control unit may deduce and output aging information from the light-emitting diode based on the reduction in the photoelectric current and/or alter the control of the light-emitting diode to correct a corresponding reduction in emitted luminous flux.

14 Claims, 3 Drawing Sheets

OPTICAL SMOKE DETECTION UNIT FOR A SMOKE DETECTOR, WITH TWO LIGHT-EMITTING DIODES OPTICALLY COUPLED TOGETHER AND WITH AN ASSOCIATED CONTROL UNIT FOR THE DEDUCTION OF AGING INFORMATION AND A SMOKE DETECTOR

CROSS-REFERENCE TO RELATED APPLICATIONS

This application claims priority to DE Application No. 10 2014 225 810.3 filed Dec. 15, 2014, the contents of which are hereby incorporated by reference in their entirety.

TECHNICAL FIELD

The invention relates to an optical smoke detection unit for a hazard alarm, in particular for a smoke detector. It comprises a first and second light-emitting diode each for the emission of monochromatic, dichromatic or polychromatic light. In addition, it has an optical receiver at least spectrally sensitive to emitted light for smoke detection such as, for example, a photodiode, and a control unit connected to the light-emitting diodes and the optical receiver for the electrical control of the light-emitting diodes and for the evaluation of a receive signal output by the optical receiver for fire parameters. The control unit is typically a microcontroller. It may also be an ASIC or realized with discrete electronic components. The respective processing steps for temporal control of the light-emitting diodes and the synchronized detection and evaluation of the respective receive signal can be realized by means of appropriate program steps executable on the microcontroller. The light-emitting diodes, the optical receiver and the microcontroller are preferably arranged on a circuit carrier and connected to each other.

BACKGROUND

Such smoke detection units are generally known. They may—as also in the case of the present invention—be part of a scattered light smoke detector in a closed or open design. In a closed design, such a scattered light smoke detector has an optical measurement chamber which is porous for smoke to be detected, but shielded from direct ambient light. Such a measurement chamber is often also described as a labyrinth. Scattered light smoke detectors of the open design, on the other hand, have a detection area located in the open air outside the detector housing. Finally, such smoke detection units may be part of an extinction smoke detector in which light attenuation as a result of smoke being present is detected and evaluated by the optical receiver.

It is also known that light-emitting diodes age during operation and in the course of time have a reduced light output. By contrast, photosensors, such as, for example, photodiodes, display comparatively minor, negligible aging phenomena. Consequently, the light output must be monitored in order to issue a warning in the case of inadequate light output for smoke detection. Alternatively, the control power or the pulse duration for control of the light-emitting diode can be increased to correct the reduced light output or the emitted luminous flux. For this the use of a separate photosensor is known which preferably receives direct light from the light-emitting diode and is arranged opposite the light-emitting diode. Depending on the photosensor signal, the warning is then output and/or the light output is compensated by means of the electrical control of the light-emitting diode.

In addition, it is known that all the optoelectronic components in the smoke detection unit become contaminated over time. This means that the optical transmitting power of the light-emitting diode and the optical detection sensitivity of the optical receiver for smoke detection as well as the separate photosensor for the monitoring of light output or luminous flux decrease as the contamination increases and regardless of the aging of these optoelectronic components.

Furthermore, monochromatic, dichromatic or polychromatic light-emitting diodes which are one-piece units are known. They have an LED housing, at least one LED chip arranged therein for the respective "color" and the terminals contacting the respective LED chip leading out of the LED housing.

SUMMARY

One embodiment provides an optical smoke detection unit for a hazard alarm, in particular, for a smoke detector, which optical smoke detection unit includes at least a first and second light-emitting diode each for the emission of monochromatic, dichromatic or polychromatic light, an optical receiver which is at least spectrally sensitive to emitted light for smoke detection, and a control unit connected to the light-emitting diodes and the optical receiver for the electrical control of the light-emitting diodes and for the evaluation of a receive signal output by the optical receiver for fire parameters, wherein the light-emitting diodes are optically coupled to each other in such a way that at least one of the light-emitting diodes illuminates the other light-emitting diode with part of the emitted light, the control unit is configured to control one of the light-emitting diodes, preferably in alternating fashion, and to switch the other light-emitting diode to operate as a photodiode and simultaneously to record a photoelectric current flowing through this as a measure for the emitted luminous flux of the controlled light-emitting diode, and the control unit is configured to deduce and output aging information regarding the controlled light-emitting diode dependent on the extent of the reduction in the photoelectric current and/or dependent thereon to alter the electrical control of the controlled light-emitting diode in order to correct a corresponding reduction in the luminous flux emitted.

In one embodiment, the light-emitting diodes each have an LED housing accommodating at least one LED chip for the emission of monochromatic, dichromatic or polychromatic light and several terminals leading out of the LED housing for connection to the respective LED chip, and wherein the control unit is configured to optionally control one of the LED chips of one of the light-emitting diodes for scattered light smoke detection, and is configured to optionally switch one of the LED chips of the other light-emitting diode to operate as a photodiode and to simultaneously detect a photoelectric current flowing through the respective LED chip in order to deduce and output aging information from the respectively controlled LED chips and/or to consequently alter the electrical control for the respectively controlled LED chips.

In one embodiment, both the light-emitting diodes are connected to each other via a light conductor for optical coupling.

In one embodiment, a transparent adhesive, a transparent silicon or a transparent wax is introduced between the LED housings of two adjacent light-emitting diodes or between a respective LED housing and an endpiece of a light conductor for the optical coupling of two light-emitting diodes.

In one embodiment, the transparent adhesive, the transparent silicon or the transparent wax has approximately the same optical refractive index as the LED housing.

In one embodiment, the light-emitting diode has an optically clear LED housing made of plastic or glass and wherein the LED housing has an optical mounting for the light conductor, in particular, a blind hole.

In one embodiment, a respective LED chip is designed for the emission of infrared, red, orange, yellow, green, blue, ultraviolet or white light.

In one embodiment, at least one of the light-emitting diodes is a dichromatic-light-emitting diode with two LED chips, wherein the first LED chip is designed to emit light with a wavelength in the range of 665 nm to 1000 nm and the second LED chip to emit light with a wavelength in the range of 350 nm to 500 nm.

In one embodiment, the photosensor for smoke detection is a light-emitting diode at least spectrally sensitive to emitted light, operated as a photodiode.

In one embodiment, the light-emitting diodes have a standard plastic housing with a 3 mm or 5 mm diameter or are SMD components for surface mounting on a circuit carrier.

Another embodiment provides a scattered light smoke detector which has a detector housing and an optical measurement chamber accommodated therein with at least one opening for the possible passage of smoke to be detected, wherein a smoke detection unit as disclosed above is accommodated in the measurement chamber and shielded from ambient light, wherein the optical receiver is arranged with both light-emitting diodes in a forward and/or back scattered light arrangement for the detection of scattered light and wherein the control unit is configured to emit a fire alarm if the receive signal output by the optical receiver exceeds a respective or combined minimum scattered light level.

Another embodiment provides an extinction smoke detector which has a detector housing and an optical measurement chamber accommodated therein with at least one opening for the possible passage of smoke to be detected, wherein a smoke detection unit as disclosed above is accommodated in the measurement chamber and shielded from ambient light, wherein the optical receiver is optically arranged opposite both the light-emitting diodes for the detection of direct light and wherein the control unit is configured to emit a fire alarm if the receive signal output by the optical receiver falls below a reference value for maximum permissible light attenuation.

In one embodiment, the optical measurement chamber has a circuit carrier for contacting the two light-emitting diodes, the optical receiver and/or the control unit, wherein the circuit carrier has a plastic cover as part of the optical measurement chamber, wherein a transparent plastic part is provided as a light conductor for the optical coupling of the two light-emitting diodes, wherein the light conductor is arranged between the circuit carrier and the plastic cover or injection molded to the plastic cover, and wherein the plastic cover has through-openings to the light-emitting diodes, enabling these to be optically coupled to each other via their respective LED housing, via the respective adjacent through-opening and via the adjacent light conductor.

In one embodiment, LED mountings for the light-emitting diodes are arranged on the plastic cover or wherein these are an integral part of the plastic cover, and wherein the LED mountings each have a through-opening for an endpiece of the light conductor.

Another embodiment provides an open scattered light smoke detector, with a smoke detection unit as disclosed above, wherein the smoke detection unit is arranged in a detector housing of the open scattered light smoke detector, wherein a detection area for the detection of scattered light is located outside the detector housing and wherein the control unit is configured to emit a fire alarm if the receive signal output by the optical receiver exceeds a minimum scattered light level.

BRIEF DESCRIPTION OF THE DRAWINGS

Example aspects and embodiments of the invention are described below with reference to the figures, in which.

DETAILED DESCRIPTION

Figure 1:
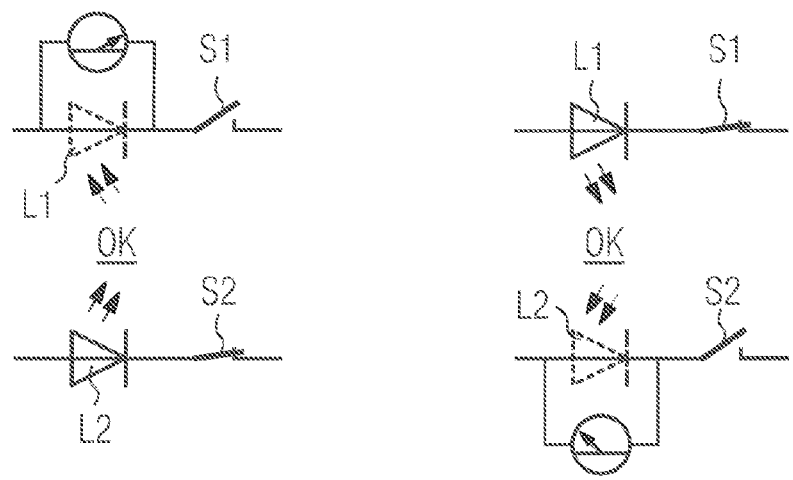
FIG. 1 shows alternating control of two light-emitting diodes and a metrological evaluation in symbolic representation, according to one embodiment.

Embodiments of the invention provide an optical smoke detection unit which operates more reliably throughout its service and operating life.

In some embodiments, the light-emitting diodes are optically coupled together in such a way that at least one of the light-emitting diodes illuminates the other light-emitting diode with part of the emitted light. The control unit is configured, preferably in an alternating fashion, to control one of the light-emitting diodes (for lighting) and to switch the other light-emitting diode to operate as a photodiode and simultaneously to detect a photoelectric current flowing through this as a measure for the emitted luminous flux of the controlled light-emitting diode. The photoelectric current is typically proportionate to the intensity of lighting and therefore also proportionate to the emitted luminous flux of the light-emitting diode. In addition, the control unit is configured or programmed to deduce and output aging information from the controlled light-emitting diode dependent on the extent of the reduction in the photoelectric current. Alternatively, or in addition, the control unit can be configured depending on the extent of the reduction in the photoelectric current to alter the electrical control of the controlled light-emitting diode in order to correct or compensate for a corresponding reduction in the emitted luminous flux.

Embodiments of the invention are based on the knowledge that each light-emitting diode can also be used or operated as a photodiode, albeit considerably less efficiently compared with photodiodes specially developed for detection purposes. Nevertheless, the light received through the other light-emitting diode is sufficient to determine at least qualitatively the luminous flux of the light-emitting diode controlled for lighting.

The extent of the reduction in the photoelectric current can be ascertained by means of the difference between a nominal current for the photoelectric current and an actual current value of the photoelectric current. The nominal current may, for example, be ascertained within the context of type or series testing of the optical smoke detection unit. It may also be an average of measured current values at the start of the operating period of the smoke detector. The nominal current established in this way may, for example, be stored in the memory of the control unit, i.e. in the non-volatile memory of the microcontroller. The control unit can be configured to detect an actual current value of the photoelectric current repeatedly and in particular, cyclically and to calculate the difference between the stored nominal current and the actually detected current value of the photoelectric current. This difference between the two current values corresponds to the extent of the reduction of the photoelectric current.

Instead of the photoelectric current, a photovoltage generated by the light-emitting diode can also be detected. To this end, an ohmic transimpedance converter which converts the photoelectric current flowing through the light-emitting diode into a proportionate photovoltage is connected in parallel to the light-emitting diode. In its operation as a photodiode, the light-emitting diode is activated by the part of the circuit arrangement for this purpose (see FIG. 2) which is provided for the electrical control of the light-emitting diode for lighting.

The optical coupling is preferably dustproof to prevent any contaminating particles from getting into the optical path between the LED housings of the light-emitting diodes.

The aging information can, for example, be a multistage amount of aging or binary aging information such as, for example, "not aged" or "aged". The amount of aging may, for example, be represented by a numerical or percentage value, such as for example, by 0% to 100%. For example, a percentage value of 0 can represent the new state and a percentage value of 100 a state in which certain smoke detection is no longer reliably possible on account of insufficient scattered light. The percentage values for the new state as well as for the state in which smoke detection is no longer certain may, for example, be metrologically ascertained within the context of type testing of the smoke detection unit or the smoke detector. Intermediate percentage values can be linearly interpolated. With a prescribed value such as, for example, 50% or 80%, a corresponding warning can then be issued, for example, via a detector bus connected to the smoke detector, via radio and/or acoustically or optically on the smoke detector itself. The detected photoelectric current of the photosensor can be assigned to the exemplary percentage range of 0% to 100% by means of a numeric table or a characteristic curve which is stored in an electronic storage unit of the microcontroller for subsequent aging evaluation by the microcontroller.

The control unit can be configured to track the emitted luminous flux of the light-emitting diode controlled (for lighting) by means of an open or closed control circuit on a required nominal luminous flux for smoke detection. The luminous flux may, for example, be altered by extending the pulse length of the electrical control of the light-emitting diode so that the light energy per light pulse also increases. Alternatively, or in addition, the drive current and thus also the luminous flux or the light output of the light-emitting diode can also be increased. Within the meaning of a closed control circuit, the current luminous flux can continue to be ascertained and tracked by means of alteration in the electrical control of the light-emitting diode.

Advantageously, no further external photosensor is necessary to monitor the emitted luminous flux as a result of optical coupling of the two light-emitting diodes with each other. As a result of optical coupling, two light-emitting diodes can advantageously monitor each other for inadmissibly great aging, i.e. for an inadmissibly great reduction in emitted luminous flux when the electrical control remains the same.

A further particular advantage is that due to the dustproof optical coupling of the two light-emitting diodes with each other, the metrological detection of the actual photoelectric current or the actual luminous flux of the controlled light-emitting diode derived therefrom is not adversely affected by contamination. For during the course of operation, contamination such as dust, smoke or soot particles is deposited in the optical path of the optical smoke detection unit. The optical path covers all the components from light generation to light detection. These components, such as light-emitting diodes, the optical receiver, the external photosensor of the prior art, as well as also apertures and optical lens are subject to contamination. As a result, the luminous flux emitted in the scattered light center and the detection sensitivity of the optical receiver decrease over time. As a result of direct optical coupling between the LED housings of the two light-emitting diodes, however, no contaminants can enter the optical coupling path.

According to one embodiment, the light-emitting diodes each have an LED housing with at least one LED chip accommodated therein for the emission of monochromatic, dichromatic or polychromatic light and several terminals leading out of the LED housing for connection to the respective LED chip. The control unit is configured to optionally control one of the LED chips of one of the light-emitting diodes for smoke detection (for lighting) and is configured to optionally switch one of the LED chips of the other light-emitting diode to operate as a photodiode. In addition, it is configured to simultaneously detect a photoelectric current flowing through the respective LED chip in order to deduce and output aging information of the respectively controlled LED chip therefrom and/or to alter the electrical control for the respectively controlled LED chips therefrom.

The photosensitivity of an LED chip for received light is better the shorter the wavelength hereof compared to the wavelength of the light emitted by the LED chip with electrical control. In other words, an infrared LED chip operating as a photodiode detects blue light significantly better than a blue LED chip detects infrared light.

By using two different "LED colors", improved smoke detection is also possible as a result of determining the particle size of the smoke particles and thus the type of smoke. The LED chips are preferably designed as floodlights, i.e. as so-called Lambert emitters. The "naked" LED chips, which are fully functional in their own right, are also called "die". They are typically square or rectangular in shape.

According to a preferred embodiment the two light-emitting diodes are connected to each other via a light conductor for optical coupling. The light conductor may, for example, be linear or plate-shaped in design. It can be made of a transparent plastic or of glass. As a result of optical coupling, the two light-emitting diodes can be arranged in different positions and in particular, at different scatter angles with regard to the optical receiver in the smoke detection unit.

Alternatively, a transparent adhesive, a transparent silicon or a transparent wax can be introduced between the LED housings of two adjacent light-emitting diodes. In this case, the previously introduced optically conducting materials assume the function of a light conductor. In the simplest case, a drop of transparent adhesive which glues together the LED housing of two adjacent light-emitting diodes suffices. The term "adjacent" means that the two light-emitting diodes have more or less the same optical axis. The two optical axes of the light-emitting diodes then run parallel to each other and at a short distance in the range of a few millimeters. Both light-emitting diodes may also have approximately the same scattered light angle in relation to the optical receiver. They may be arranged next to each other or above one another.

Alternatively, a transparent adhesive, a transparent silicon or a transparent wax may be introduced between a respective LED housing and an endpiece of a light conductor for the optical coupling of two light-emitting diodes. This results in a continuous optical path from the respective LED chip through the LED housing and then by way of the optically conducting material into the respective end of the light conductor.

Preferably, the transparent adhesive, the transparent silicon or the transparent wax has virtually the same optical refractive index compared with the LED housing.

In accordance with one embodiment the light-emitting diode has an optically clear LED housing made of plastic or glass. If the LED housing has an optical mounting for the light conductor, it is possible to connect the light conductor to the LED housing with particular ease. It is particularly advantageous if a blind hole is recessed or inserted in the LED housing with a diameter slightly greater than the outside diameter of the light conductor. In this case, the endpiece of the light conductor can be inserted into the blind hole and fastened there, for example, by means of a previously introduced optical adhesive. If the blind hole is arranged in the LED housing, for example, at the level of a lateral edge of an LED chip, the fraction of otherwise scarcely usable light can couple into the light conductor particularly effectively.

Preferably, a respective LED chip is designed to emit monochromatic infrared, red, orange, yellow, green, blue or ultraviolet light. Alternatively, it can be designed to emit white light if appropriate luminescent yellow materials are applied to a luminescent blue or ultraviolet LED chip surface.

In particular, at least one of the light-emitting diodes is a dichromatic light-emitting diode with two LED chips, wherein the first LED chip is designed to emit light with a wavelength in the range of 665 nm to 1000 nm and the second LED chip to emit light with a wavelength in the range of 350 nm to 500 nm. In particular, the first LED chip is designed to emit light with a wavelength of 940 nm±40 nm or 860 nm±40 nm and the second LED chip to emit light with a wavelength of 460 nm±40 nm or 390 nm±40 nm.

According to a further embodiment, the photosensor provided for smoke detection is a light-emitting diode at least spectrally sensitive to light emitted by the two light-emitting diodes and operated as a photodiode. As a result, for example, through the use of light-emitting diodes of the same type a particularly simple, inexpensive smoke detection unit can be realized.

In accordance with one embodiment the light-emitting diodes have a standard plastic housing with a diameter of 3 mm or 5 mm. These standard housings are produced in a plastic molding process in which an LED chip carrier with the LED chip(s) applied thereto, together with the terminals, are molded into the plastic housing. As is known, such 3 mm or 5 mm light-emitting diodes are sold "off the shelf" as mass-produced consumer products. Light-emitting diodes with such a standard housing are typically provided for hole mounting. Alternatively, the light-emitting diode may also be an SMD-component for surface mounting on a circuit carrier.

Other embodiments provide a scattered light smoke detector which has a detector housing and an optical measurement chamber accommodated therein with at least one opening for the possible passage of smoke to be detected. A smoke detection unit shielded from ambient light is accommodated in the measurement chamber. The optical receiver—typically a silicon PIN photodiode—is arranged with both light-emitting diodes in a forward and/or back scattered light arrangement for the detection of scattered light. The control unit is configured to emit a fire alarm if the receive signal output by the optical receiver exceeds a respective or combined minimum scattered light level.

With a forward scattered light arrangement, the angle between the light-emitting diode and the optical receiver ranges from 20° to 90°, in particular, from 30° to 70°. With a back scattered light arrangement this angle ranges from more than 90° to 160°, in particular, from 110° to 150°.

Other embodiments provide an extinction smoke detector. Unlike the scattered light smoke detector, here the optical receiver is arranged optically opposite both the light-emitting diodes for the detection of direct light. The control unit is configured to emit a fire alarm if the receive signal output by the optical receiver falls below a reference value for the maximum permissible light attenuation. The term "optically opposite" also includes the reflection of the light emitted by the light-emitting diodes by way of mirrors and retroreflectors.

With both the aforementioned smoke detectors, the optical measurement chamber has a circuit carrier for contacting the two light-emitting diodes, the optical receiver and/or the control unit. The circuit carrier has a cover, in particular, a plastic cover, as part of the optical measurement chamber. Preferably, the cover is made of a black plastic. It preferably has light-absorbing structures such as, for example, fluted surfaces. A transparent plastic part may be provided as a light conductor for optical coupling of the two light-emitting diodes. This light conductor can be arranged between the circuit carrier and the plastic cover. It can, for example, be placed in a corresponding groove-shaped recess in the plastic cover. Alternatively, the light conductor can be molded to the plastic cover, for example, by means of a so-called two-component injection-molding process. Furthermore, the plastic cover has through-openings or recesses to the light-emitting diodes so that these can be optically coupled together via their respective LED housing, via the respective adjacent through-opening and via the adjacent light conductor there.

Preferably, LED mountings for the light-emitting diodes are arranged on the plastic cover. These LED mountings may also be an integral part of the plastic cover itself. They may, for example, be half-shell-shaped. The LED mountings each have a through-opening for an endpiece of the light conductor. In other words, a light-emitting diode accommodated there couples direct light into the endpiece of the light conductor adjacent to the LED housing.

Still other embodiments provide an open scattered light smoke detector which has an optical smoke detection unit as disclosed herein. The latter is arranged in a detector housing of the open scattered light smoke detector. A detection area for the detection of scattered light is located outside the detector housing. In other words, there are no further parts of the detector housing between the light-emitting diodes and the detection area in the open air on the one hand and between the optical receiver and the detection area in the open air on the other hand. Apart from this, there may be a transparent cover on the detector housing to protect the light-emitting diodes and the optical receiver from contamination. The control unit is configured to emit a fire alarm if the receive signal output by the optical receiver exceeds a minimum scattered light level.

FIG. 1 shows the alternating control of two light-emitting diodes L1, L2 and a metrological evaluation in symbolic representation, according to one embodiment.

In the left part of the figure a second light-emitting diode L2, for example, a "blue" light-emitting diode for the emission of blue light, is electrically controlled, symbolized by a closed switch S2. In contrast, at the same time a first light-emitting diode L1, for example, an "infrared" light-emitting diode, is switched to operate as a photodiode, symbolized by an open switch S1 and by a measuring instrument for the detection of a photoelectric current or a photovoltage of the "blue" light-emitting diode L2 which is optically coupled to the first light-emitting diode L1. As a result, part of the light emitted by the second light-emitting diode L2 can be detected by the first light-emitting diode L1. The term "simultaneously" here means within the light duration of the respective light-emitting diode L1, L2, controlled for lighting i.e. within a light pulse which is metrologically detected by light emitted by this light-emitting diode L1, L2.

In the right part of the figure the first "infrared" light-emitting diode L1 for the emission of infrared light is electrically controlled, symbolized by the closed switch S1. By contrast, simultaneously the second "blue" light-emitting diode L2 is switched to operate as a photodiode, symbolized by the open switch S2 and by a measuring instrument for the detection of a photoelectric current or a photovoltage of the "infrared" light-emitting diode L1 which is optically coupled to the second light-emitting diode L2. As a result, now in reverse a part of the light emitted by the first light-emitting diode L1 can be detected by the second light-emitting diode L2. Generally speaking, the detection of blue light by the infrared light-emitting diode L1 in this case is more efficient than the detection of infrared light by the blue light-emitting diode L2 in this case. This is symbolized in FIG. 1 by the smaller needle deflection in the case of the "blue" light-emitting diode L2 compared to the needle deflection in the case of the "infrared" light-emitting diode L1.

Figure 2:
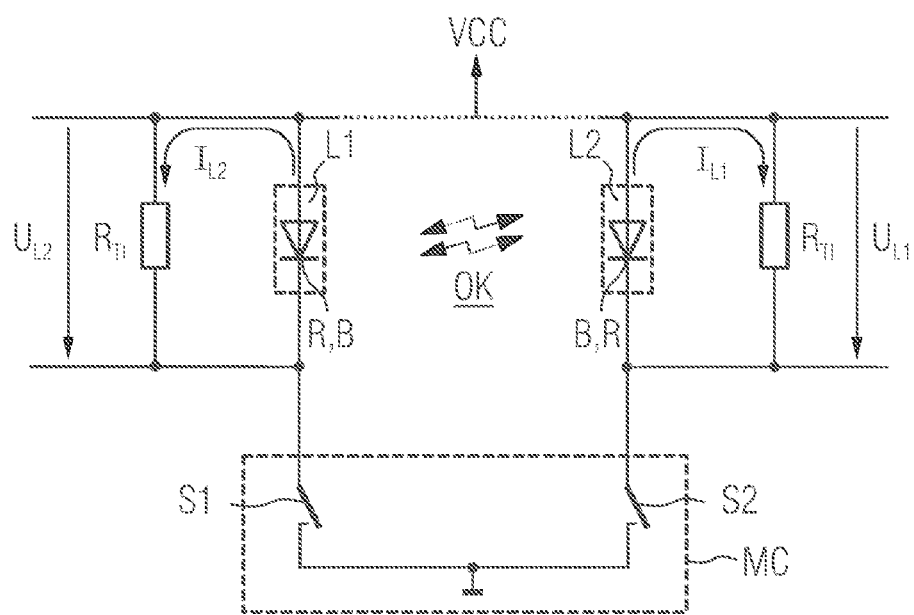
FIG. 2 shows an exemplary circuit arrangement for alternating control and for alternating evaluation of two light-emitting diodes in each case by means of a transimpedance converter according to one embodiment.

FIG. 2 shows an exemplary circuit arrangement for alternating control and for alternating evaluation of two light-emitting diodes L1, L2, in each case by means of a transimpedance converter $R_{TI}$ according to one embodiment. In the lower part of FIG. 2 a control unit MC designed as a microcontroller is shown which is programmed to open and close the two switches S1, S2 in alternating fashion. Customarily, the two switches S1, S2 are switching transistors. In the present example, they are already integrated in the microcontroller MC. Using the two switches S1, S2, the two light-emitting diodes L1, L2 are alternately switched to emit light to a supply voltage VCC. An ohmic resistor $R_{TI}$ respectively switched in parallel to a light-emitting diode L1, L2 is provided to convert a respective generated photoelectric current $I_{L1}$, $I_{L2}$ in "photodiode" operating mode to a corresponding photovoltage $U_{L2}$, $U_{L1}$. The ohmage of the two resistors $R_{TI}$ is many times greater than the internal resistance of the light-emitting diodes L1, L2 in a forward direction. The photovoltages $U_{L2}$, $U_{L2}$ now obtained are essentially proportionate to the respective photoelectric current through the light-emitting diodes, which in turn is essentially proportionate to the luminous flux emitted. The photovoltages $U_{L2}$, $U_{L2}$ obtained can now be detected by an A/D converter and evaluated by the microcontroller MC with particular ease. The A/D converters can also be integrated in the microcontroller MC.

FIG. 3 to FIG. 6 show various examples of two coupled light-emitting diodes L1, L2 in each case.

Figure 3:
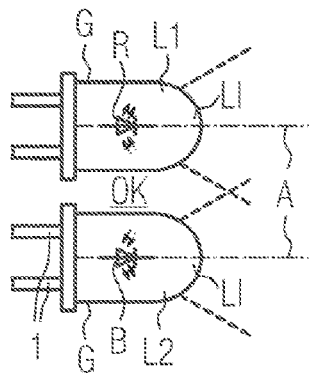
FIGS. 3-6 show various examples of two optically coupled light-emitting diodes.

In the example in FIG. 3, the two light-emitting diodes L1, L2 are adjacent to each other. In addition, they are facing the same way, i.e. both their optical axes A run parallel to each other. The first light-emitting diode L1 has an exemplary red luminescent LED chip R and the second light-emitting diode L2 a blue luminescent LED chip B. G designates the respective LED housing in the typical shape of a 5 mm-standard housing. In the housing G, there is an optical lens LI for light squeezing respectively. The reference character 1 designates the terminals of the light-emitting diodes L1, L2 for electrical control and for metrological detection of a photoelectric current when the respective light-emitting diode L1, L2 is operated as a photodiode. This is achieved by means of an appropriate measurement arrangement, for example, as shown in FIG. 2.

Figure 4:
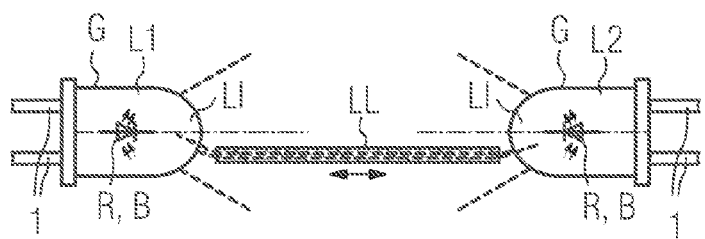

FIG. 4 shows a diagrammatic view of two light-emitting diodes L1, L2 optically coupled together via a light conductor LL. FIG. 4 essentially shows how part of the light emitted by the light-emitting diode L1 on the left is coupled into the light conductor LL, then passes through the light conductor LL, is decoupled at the other end of the light conductor LL and passes through the LED housing G of the light-emitting diode L2 on the right and illuminates this light-emitting diode L2 there. If the light-emitting diode L2 on the right is operated as a photodiode, i.e. it is not actively controlled with a current for emitting light, then a photoelectric current generated by the light-emitting diode L2 on the right or a generated electrical photovoltage can be detected and evaluated. Vice versa, the light-emitting diode L1 on the left may also be illuminated by part of the light emitted by the light-emitting diode L2 on the right. The opposing arrangement of the two light-emitting diodes L1, L2 is only to be understood symbolically, like the optical coupling of the light conductor LL to the respective LED housing G. In the example, both the light-emitting diodes L1, L2 each have only a single LED chip R, B with the option of the same or a different "light color" from each other.

If, for example, both light-emitting diodes L1, L2 have an LED chip R, B of the same color, for example, an infrared LED chip, then particularly effective mutual monitoring of the two light-emitting diodes L1, L2 is possible. The use of two monochromatic-light-emitting diodes L1, L2 with the same light color is, for example, advantageous for a combined forward and back scattered light smoke detector.

Figure 5:
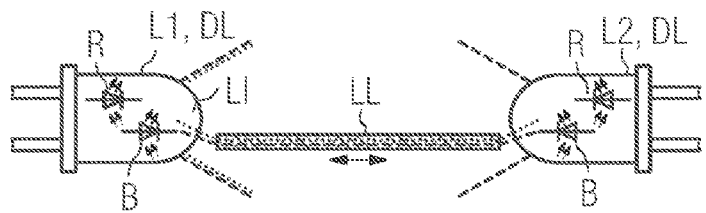

FIG. 5 distinguishes itself from FIG. 4 in that both the light-emitting diodes L1, L2 are designed as dichromatic-light-emitting diodes DL. Such light-emitting diodes DL are also called dual or duo LEDs. Typically, they each have two LED chips R, B with different light colors from each other, for example, infrared and blue. The two respective LED chips R, B can be controlled independently of each other for lighting, and therefore also jointly. Correspondingly, one of the two LED chips R, B of such a dichromatic-light-emitting diode DL or both simultaneously can be switched to operate as a photodiode.

Figure 6:
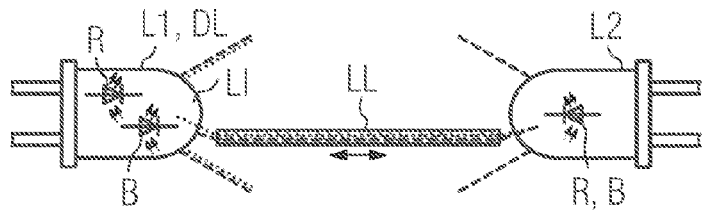

FIG. 6 shows a combination of FIG. 4 and FIG. 5 with a single dichromatic-light-emitting diode DL and a monochromatic-light-emitting diode L2 optically coupled to it.

Figure 7:
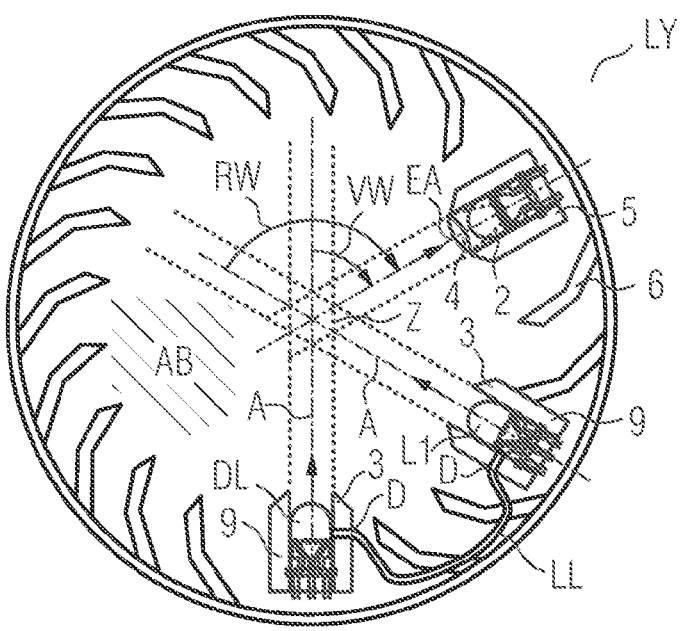
FIG. 7 shows an example of a smoke detection unit for a scattered light smoke detector with a dichromatic-light-emitting diode, a monochromatic-light-emitting diode and an optical receiver in a forward and back scattered light arrangement, according to one embodiment.

FIG. 7 shows an example of a smoke detection unit for a scattered light smoke detector with a dichromatic-light-emitting diode DL, a monochromatic-light-emitting diode L1 and with an optical receiver 2 with an upstream optical lens 4 in a forward and back scattered light arrangement. LY denotes an optical measurement chamber which is permeable for smoke to be detected and shielded from direct ambient light. This is achieved by an appropriate arrangement of fins 6 in the measurement chamber LY.

A denotes the optical axes of the two light-emitting diodes DL, L1 and EA the optical receiving axis of the optical receiver 2. The dichromatic-light-emitting diode DL is arranged with the optical receiver 2 at a forward scattered light angle VW of approximately 60°. Preferably, it has an infrared and a blue luminescent LED chip. The monochromatic-light-emitting diode L1 is arranged with the optical receiver 2 at a back scattered light angle RW of approximately 120°. The monochromatic-light-emitting diode L1 preferably has an infrared luminescent LED chip. Z furthermore denotes a common scattered light center Z for smoke detection. Part of the scattered light from particles to be detected which are illuminated by the two light-emitting diodes DL, L1 in this scattered light center Z or measurement volume finally reaches the optical receiver 2. In order to prevent direct light from getting from the light-emitting diode DL to the optical receiver 2, in addition apertures 3, 5 are provided.

In FIG. 7 it can be seen that a linear light conductor LL with one endpiece in each case is adjacent to the side of the LED housing of the two light-emitting diodes Dl, L2, enabling part of the light emitted by the respective light-emitting diode DL, L1 to couple into the light conductor LL and be detected by the other light-emitting diode L1, DL respectively. D denotes a through-opening in the aperture 3 shown, through which an endpiece of the light conductor LL projects. The aperture 3 is preferably part of an LED mounting 9 for the incorporation, alignment and fastening of the respective light-emitting diode DL, L1 in the optical measurement chamber LY. The light conductor LL shown is preferably routed "behind" the two light-emitting diodes DL, L1, preventing any scattered light being reflected from the light conductor LL to the optical receiver 2.

Figure 8:
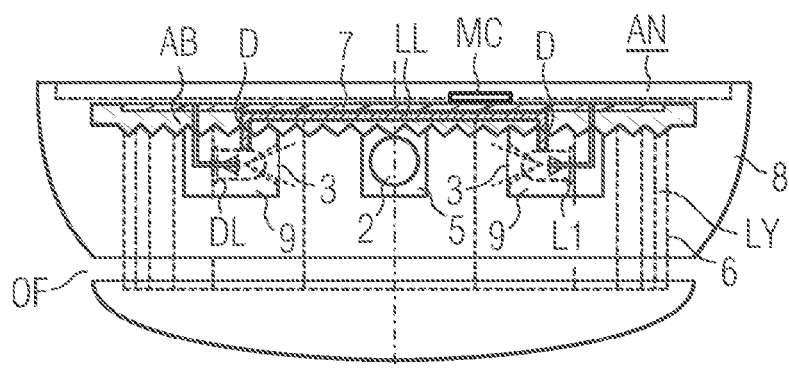
FIG. 8 shows a cutaway view of a smoke detector of a closed design with a light conductor for optical coupling of two light-emitting diodes.

FIG. 8 shows a cutaway view through a scattered light smoke detector of a closed design with a light conductor LL for the optical coupling of two light-emitting diodes DL, L1. A detector housing is denoted by the reference character 8. Via smoke inlet openings OF in the detector housing 8 smoke to be detected can reach an interior optical measurement chamber LY. In the upper part, AN denotes a base housing of the scattered light smoke detector in order to attach this detachably to a detector base, which in turn is fastened to a cover. FIG. 8 also shows a cutaway view of a circuit carrier 7 for the electrical contacting of the two light-emitting diodes DL, L1, and the optical receiver 2 and a microcontroller MC as a control unit. A cover AB is arranged on the circuit carrier 7 forming the base of the optical measurement chamber LY. It is preferably made of a black light-absorbing plastic. Furthermore, it has light-absorbing structures on its side facing the measurement chamber LY, symbolized by a zigzag structure. In the image shown, besides the scattered light arrangements of light-emitting diodes DL, L1 and optical receiver 2, a light conductor LL arranged between the circuit carrier 7 and the plastic cover AB can also be seen. Both its endpieces project through a respective through-opening D in the cover AB and adjoin a respective LED mounting 9. When the light-emitting diodes DL, L1 are mounted, with their LED housing G they then directly adjoin the respective endpiece of the light conductor LL for possible coupling in and out of light. Routing the light conductor LL between the circuit carrier 7 and the plastic cover AB simplifies the work of mounting considerably. At the same time, the shining reflective surface of the light conductor LL is advantageously prevented from acting as an optical diffuser for light emitted from the light-emitting diodes DL, L1 in the optical measurement chamber LY.

LIST OF REFERENCE CHARACTERS

1 Optical smoke detection unit
2 Photosensor, silicon PIN photodiode, light-emitting diode
3 Aperture, pinhole aperture
4 Optical lens
5 Optical receiver-aperture
6 Fins, light-shielding element
7 Circuit carriers, printed circuit board
8 Detector housing
9 LED mounting
A Optical axis, optical transmission axis
AB Plastic cover
AN Base housing
B Blue LED chip
D Through-opening, recess
DL Dichromatic-light-emitting diode, dual-LED, duo-LED
EA Optical axis, optical receiving axis
G LED housing
$I_{L1}$, $I_{L2}$ Photocurrent
L1, L2 Light-emitting diode, LED
LI Optical lens
LL Light conductor
LY Optical measurement chamber, labyrinth
MC Control unit, microcontroller
OF Smoke inlet opening
OK Optical coupling
PD Photodiode, photosensor chip
R Red LED chip
$R_{TT}$ Resistor, transimpedance converter
RW Backscattering angle
S1, S2 Controllable switch, transistor
$U_{L1}$, $U_{L2}$ Photovoltage
VCC Supply voltage
VW Forward scattering angle
Z Scattered light center, measurement volume

What is claimed is:

1. An optical smoke detection unit for a hazard alarm for a smoke detector, the smoke detection unit comprising:
a first light-emitting diode and a second light-emitting diode, each light-emitting diode configured to emit monochromatic, dichromatic, or polychromatic light,
wherein the first and second light-emitting diodes are optically coupled to each other such that at least one of the light-emitting diodes illuminates the other light-emitting diode,
an optical receiver that is at least spectrally sensitive to emitted light for smoke detection, and
a control unit connected to the light-emitting diodes and the optical receiver, the control unit configured to:
evaluate of a receive signal output by the optical receiver for fire parameters, and emit a fire alarm if the receive signal exceeds a predefined scattered light level, control one of the first and second light-emitting
diodes, and switch the other light-emitting diode to
operate as a photodiode,
record a photoelectric current flowing through the
controlled light-emitting diode as a measure of emitted luminous flux of the controlled light-emitting
diode,
determine an extent of a reduction in the photoelectric
current,
based on the extent of the reduction in the photoelectric
current, perform at least one of the following:
determine and output aging information regarding
the controlled light-emitting diode based on the
extent of the reduction in the photoelectric current,
or
alter an electrical control of the controlled light-emitting diode to correct a corresponding reduction in emitted luminous flux.

2. The smoke detection unit of claim 1, wherein each of the first and second light-emitting diodes includes:
an LED housing accommodating at least one LED chip
configured to emit monochromatic, dichromatic, or
polychromatic light, and
a plurality of terminals leading out of the LED housing for
connection to the respective LED chip, and
wherein the control unit is configured to:
optionally control one of the LED chips of one of the
light-emitting diodes for scattered light smoke detection, and
optionally switch one of the LED chips of the other
light-emitting diode to operate as a photodiode and
to simultaneously detect a photoelectric current
flowing through the respective LED chip in order to
at least one of (a) deduce and output aging information from the respectively controlled LED chips or
(b) consequently alter the electrical control for the
respectively controlled LED chips.

3. The smoke detection unit of claim 1, wherein both the first and second light-emitting diodes are connected to each other via a light conductor for optical coupling.

4. The smoke detection unit as claimed of claim 2, comprising a transparent adhesive, a transparent silicon, or a transparent wax arranged between the LED housings of two adjacent light-emitting diodes or between a respective LED housing and an endpiece of a light conductor for optical coupling of two light-emitting diodes.

5. The smoke detection unit of claim 4, wherein the transparent adhesive, the transparent silicon, or the transparent wax has approximately the same optical refractive index as the LED housing.

6. The smoke detection unit of claim 3, wherein the light-emitting diode has an optically clear LED housing made of plastic or glass, and wherein the LED housing has an optical mounting for the light conductor.

7. The smoke detection unit of claim 2, wherein a respective LED chip is configured to emit infrared, red, orange, yellow, green, blue, ultraviolet, or white light.

8. The smoke detection unit of claim 1, wherein at least one of the light-emitting diodes is a dichromatic-light-emitting diode with two LED chips,
wherein the first LED chip is configured to emit light with
a wavelength in the range of 665 nm to 1000 nm, and
the second LED chip is configured to emit light with a
wavelength in the range of 350 nm to 500 nm.

9. The smoke detection unit of claim 1, wherein the photosensor for smoke detection is a light-emitting diode at least spectrally sensitive to emitted light, operated as a photodiode.

10. The smoke detection unit of claim 1, wherein the light-emitting diodes have a standard plastic housing with a 3 mm or 5 mm diameter or are SMD components for surface mounting on a circuit carrier.

11. A scattered light smoke detector, comprising:
a detector housing having at least one opening for receiving smoke to be detected,
an optical measurement chamber arranged in the detector
housing and in communication with the at least one
opening in the housing,
a smoke detection unit accommodated in the measurement chamber and shielded from ambient light, the
smoke detection unit comprising:
a first light-emitting diode and a second light-emitting
diode, each light-emitting diode configured to emit
monochromatic, dichromatic, or polychromatic
light,
wherein the first and second light-emitting diodes are
optically coupled to each other such that at least one
of the light-emitting diodes illuminates the other
light-emitting diode,
an optical receiver that is at least spectrally sensitive to
emitted light for smoke detection, wherein the optical receiver is arranged with both light-emitting
diodes in a forward and/or back scattered light
arrangement for the detection of scattered light, and
a control unit connected to the light-emitting diodes
and the optical receiver, the control unit configured
to:
evaluate of a receive signal output by the optical
receiver for fire parameters, and emit a fire alarm
if the receive signal exceeds a respective or combined minimum scattered light level,
control one of the first and second light-emitting
diodes, and switch the other light-emitting diode
to operate as a photodiode,
determine a reduction in photoelectric current flowing through the controlled light-emitting diode,
based on the reduction in the photoelectric current,
perform at least one of the following:
determine and output aging information regarding
the controlled light-emitting diode based on the
extent of the reduction in the photoelectric
current, or
alter an electrical control of the controlled light-emitting diode to correct a corresponding
reduction in emitted luminous flux.

12. An extinction smoke detector, comprising:
a detector housing having at least one opening for receiving smoke to be detected, and
an optical measurement chamber arranged in the detector
housing and in communication with the at least one
opening in the housing,
a smoke detection unit accommodated in the measurement chamber and shielded from ambient light, the
smoke detection unit comprising:
a first light-emitting diode and a second light-emitting
diode, each light-emitting diode configured to emit
monochromatic, dichromatic, or polychromatic
light, wherein the first and second light-emitting diodes are optically coupled to each other such that at least one of the light-emitting diodes illuminates the other light-emitting diode, an optical receiver that is at least spectrally sensitive to emitted light for smoke detection, wherein the optical receiver is optically arranged opposite both the light-emitting diodes for the detection of direct light, and a control unit connected to the light-emitting diodes and the optical receiver, the control unit configured to:

evaluate of a receive signal output by the optical receiver for fire parameters, and emit a fire alarm if the receive signal output by the optical receiver falls below a reference value for maximum permissible light attenuation, control one of the first and second light-emitting diodes, and switch the other light-emitting diode to operate as a photodiode, determine a reduction in photoelectric current flowing through the controlled light-emitting diode, based on the reduction in the photoelectric current, perform at least one of the following:

determine and output aging information regarding the controlled light-emitting diode based on the extent of the reduction in the photoelectric current, or alter an electrical control of the controlled light-emitting diode to correct a corresponding reduction in emitted luminous flux.

13. The smoke detector of claim 11, wherein the optical measurement chamber includes a circuit carrier for contacting at least one of (a) the two light-emitting diodes, (b) the optical receiver, or (c) the control unit, wherein the circuit carrier has a plastic cover as part of the optical measurement chamber, wherein a transparent plastic part is provided as a light conductor for the optical coupling of the two light-emitting diodes, wherein the light conductor is arranged between the circuit carrier and the plastic cover or injection molded to the plastic cover, and wherein the plastic cover has through-openings to the light-emitting diodes, enabling optically coupling of the light-emitting diodes to each other via the respective LED housing, via a respective adjacent through-opening, and via an adjacent light conductor.

14. The smoke detector of claim 13, wherein:

LED mountings for the light-emitting diodes are either arranged on the plastic cover or formed as an integral part of the plastic cover, and each LED mounting has a through-opening for an endpiece of the light conductor.

* * * * *